United States Patent [19]

Inokuchi

[11] Patent Number: 4,745,417

[45] Date of Patent: May 17, 1988

[54] SELF SCANNED RECORDING ELEMENT

[75] Inventor: Toshiyuki Inokuchi, Yokohama, Japan

[73] Assignee: Ricoh Company, Ltd., Tokyo, Japan

[21] Appl. No.: 883,499

[22] Filed: Jul. 8, 1986

[51] Int. Cl.[4] .................................................. G01D 9/42
[52] U.S. Cl. ...................................... 346/108; 358/296
[58] Field of Search .................... 346/108, 107 R, 762, 346/160; 358/296, 300, 285, 293

[56] References Cited

U.S. PATENT DOCUMENTS 4,661,828 4/1987 Miller et al. ........................ 346/108

*Primary Examiner*—H. Broome
*Assistant Examiner*—Mark Reinhart
*Attorney, Agent, or Firm*—Oblon, Fisher, Spivak, McClelland & Maier

[57] ABSTRACT

A device for writing optical information including a roof mirror array, a lens array, an optical-path separator, a mirror member, a housing, and a self-scanned recording element. The roof mirror array, the lens array, the optical-path separator, and the mirror member are retained by the housing in a prescribed mutual positional relationship. The housing has a pair of slits, one of which is covered with the light-signal producing surface of the self-scanned recording element. The housing is shaped such that the light-signal producing surface of the self-scanned recording element is held in registration with an object surface on which an unmagnified object image would be formed by the lens array and the roof mirror array.

5 Claims, 4 Drawing Sheets

SELF SCANNED RECORDING ELEMENT

BACKGROUND OF THE INVENTION

1. Field of the Invention

The present invention relates generally to a device for writing optical information and more particularly to a device for writing optical information, employing a self-scanned recording element.

2. Discussion of Background

Self-scanned recording elements serve to convert image signals to corresponding spatially arranged light signals. Examples of such self-scanned recording elements include an LED array, a liquid-crystal shutter array, a fluorescent dot array, and the like. The fluorescent dot array comprises an array of fluorescent layer dots disposed on an electrode array, with the fluorescent layer dot array and a wire electrode sealed in a vacuum chamber. Thermions or thermoelectrons emitted from the wire electrode are attracted by the electrode array to hit the fluorescent layer dots, causing the latter to emit fluorescent light.

One recently proposed optical information writing device employing such a self-scanned recording element is illustrated in FIG. 5 of the accompanying drawings. As shown in FIG. 5, an image-forming optical system 40 is interposed between an LED array 30 serving as a self-scanned recording element and a photosensitive recording medium 50 such as a photoconductive photosensitive body on which optical information is to be written. The direction normal to the sheet of FIG. 5 will hereinafter be referred to as a Z direction.

The image-forming optical system 40 comprises a roof mirror array 42, a lens array 44, a right-angled mirror 46, and a housing 48 accommodating the roof mirror array 42, the lens array 44, and the right-angled mirror 46 in mutually spaced relationship. The roof mirror array 42 is of a structually integral optical component having an array of roof mirrors arranged at a constant pitch in the Z direction, each of the roof mirrors having a ridge extending vertically in FIG. 5. The lens array 44 includes an array of lenses arranged in the Z direction at the same pitch as that of the roof mirrors of the roof mirror array 42. Each of the lenses of the lens array 44 is optically associated with one of the roof mirrors of the roof mirror array 42.

Each of the lenses of the lens array 44 and the corresponding roof mirror combined therewith jointly constitute a retrodirective image-forming optical system for forming an unmagnified image of an object on a surface of the object. Therefore, the roof mirror array 42 and the lens array 44 jointly constitute an array of such retrodirective image-forming optical systems.

The right-angled mirror 46 comprises two plane mirrors which are elongate in the Z direction, the plane mirrors having mirror surfaces normal to each other. The roof-mirror array 42, the lens array 44, and the right-angled mirror 46 are retained in the housing 48 as shown in FIG. 5. The housing 48 has a pair of slits extending in the Z direction and aligned vertically with each other, with cover glass strips 41, 43 fitted in the respective slits.

The surface of the LED array 30 from which light signals are emitted and the photosensitive recording medium surface are held in unmagnified-image-forming relationship by the image-forming optical system 40. When the LED array 30 is energized, light emitted therefrom enters the image-forming optical system 40 through the cover glass strip 41 in the upper slit of the housing 48 and is reflected to the right by the right-angled mirror 46. Then, the light passes through the lens array 44 and is reflected by the roof mirror array 42 back through the lens array 44 to the right-angled mirror 46. The light is reflected by the right-angled mirror 46 to exit from the image-forming optical system 40 through the cover glass strip 43. The light then falls on the recording medium 50 to form an image produced by the light emitted from the LED array 30.

By moving the surface of the recording medium 50 in the direction of the arrow while applying an image signal to the LED array 30 to enable it to generate optical information representative of the image signal, such optical information can be written or recorded on the recording medium 50. Where the recording medium 50 is a photoconductive photosensitive body, an electrostatic latent image corresponding to the image information can be formed thereon by such an information writing process.

With the optical information writing device shown in FIG. 5, however, the surface of the self-scanned recording element from which light signals are produced and the recording medium surface must be held in proper unmagnified-image-forming relationship through the intermediary of the image-forming optical system. It has been tedious and time-consuming to adjust the relative positions of the self-scanned recording element, the image-forming optical system, and the recording medium.

There have been developed mass-producible self-scanned recording elements of low power requirements, which are of a compact construction having a light signal generator and a driver circuit that are formed integrally on one substrate in in-line configuration.

SUMMARY OF THE INVENTION

In view of the aforesaid shortcomings of the prior device, it is an object of the present invention to provide an optical information writing device which includes components that are positionally adjustable with ease and which is relatively small in overall size.

A device for writing optical information according to the present invention includes a roof mirror array, a lens array, an optical-path separator, a mirror member, a housing, and a self-scanned recording element.

Like the roof mirror array 42 shown in FIG. 5, the roof mirror array is of a structurally integral construction having roof mirrors arrayed at a constant pitch. The lens array is also structurally integral and has an array of lenses arranged at a constant pitch, like the lens array 44 shown in FIG. 5. The pitch at which the lenses of the lens array are arranged is the same as that at which the roof mirrors are arrayed. Each of the lenses is optically associated with one of the roof mirrors of the roof mirror array, and they jointly serve as a retrodirective image-forming optical system. The optical-path separator is disposed between the roof mirror array and the lens array for separating optical paths between the lenses and the corresponding roof mirrors. Stated otherwise, the optical-path separator separates the optical paths of the retrodirective image-forming optical system that extend between the lenses and the roof mirrors associated respectively therewith. Therefore, a light ray falling on a lens is directed only to the roof mirror associated therewith, and is prevented from falling on the other roof mirrors.

The mirror member, which may be composed of one mirror or two mirrors, is positioned opposite to and remotely from the roof mirror array with the lens array interposed therebetween, the mirror member extending longitudinally along the lens array.

The housing retains therein the roof mirror array, the lens array, the optical-path separator, and the mirror member in certain positional relationship. The housing has a pair of slits extending longitudinally along the lens array. One of the slits is covered with the light-signal producing surface of the self-scanned recording element, which is fixedly mounted on the housing. The housing is shaped such that the light-signal producing surface of the self-scanned recording element is held in registration with an object surface on which an unmagnified object image would be formed by the lens array and the roof mirror array.

The self-scanned recording element may comprise an LED array, a liquid-crystal shutter array, a fluorescent dot array, a light valve, or the like.

Since the self-scanned recording element is held in desired positional relationship to an image-forming system composed of the lens array and the roof mirror array, an image of optical information can automatically be formed on a photosensitive recording medium simply by positioning the optical information writing device with respect to the recording medium. The device of the present invention can therefore be positionally adjusted with greater ease and higher accuracy than the conventional device, and such highly accurate positional relationship can easily be maintained. In as much as the self-scanned recording element and the image-forming system are of a unitary structure, the device is relatively small in overall size. The device is inexpensive to manufacture because the housing serves to support the self-scanned recording element and hold the lens array, the roof mirror array, the optical-path separator, and the mirror member.

Brief Description of the Drawings

The above and other objects, features and advantages of the present invention will become more apparent from the following description when taken in conjunction with the accompanying drawings wherein.

DESCRIPTION OF THE PREFERRED EMBODIMENTS

Figure 1:
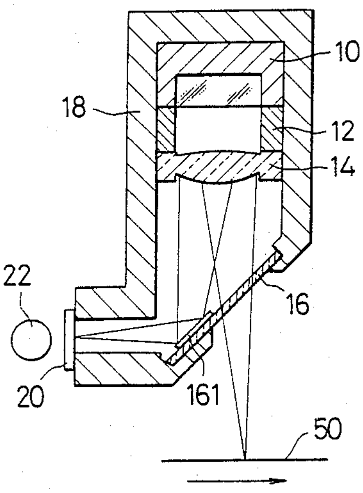
FIG. 1 is a transverse cross-sectional view of a device for writing optical information according to an embodiment of the invention.

Various other objects, features and attendant advantages of the present invention will be more fully appreciated as the same becomes better understood from the following detailed description when considered in connection with the accompanying drawings in which like reference characters designate like or corresponding parts throughout the several view and wherein to FIGS. 1 through 4 illustrate devices for writing optical information according to four different embodiments of the present invention. The direction normal to the sheets of FIGS. 1 through 4 will be referred to as a Z direction which is the same as the longitudinal direction of a lens array in each of the embodiments. Like or corresponding reference characters denote like or corresponding parts in FIGS. 1 through 4. The opposite ends of each device in the Z direction are closed by side walls (not shown).

As shown in FIG. 1, a device for writing optical information includes a roof mirror array 10, an optical-path separator 12, a lens array 14, a mirror member 16, a housing 18, a liquid crystal shutter array 20 serving as a self-scanned recording element, and a fluorescent lamp 22 serving as an illuminating lamp.

The roof mirror array 10 comprises an array of roof mirrors arranged at a constant pitch in the Z direction, and the lens array 14 comprises an array of lenses arranged at the same pitch as that of the roof mirror array 10 in the Z direction. The roof mirrors and the lenses are in one-to-one correspondence. The optical-path separator 12 comprises an elongate plate extending in the Z direction and having a longitudinal array of circular holes defined therein at a constant pitch which is the same as that at which the lenses are arranged. Each of the circular holes is positioned between one lens and the roof mirror optically associated therewith.

The housing 18 has a pair of slits extending in the Z direction, one of the slits being covered by the liquid crystal shutter array 20 fixedly mounted on the housing 18. The liquid crystal shutter array 20 has an array of liquid crystal shutters arranged in the Z direction. When the fluorescent lamp 22 is energized and an image signal is applied to the liquid crystal shutter array 20, the liquid crystal shutters are opened and closed according to the applied image signal to produce a light signal from its light-signal producing surface, i.e., the surface exposed to the interior of the housing 18.

The mirror member 16 comprises an elongate transparent plate with a mirror surface 161 formed by vapor deposition on one longitudinal side of the plate. The other slit of the housing 18 is covered by the mirror member 16. Therefore, the interior of the housing 18 is sealed off by the liquid crystal shutter array 20 and the mirror member 16 against entry of dust.

By energizing the fluorescent lamp 22 and applying an image signal to the liquid crystal shutter array 20, the light of a light signal generated from the light-signal producing surface of the liquid crystal shutter array 20 is reflected by the mirror surface 161 on one longitudinal side of the transparent plate of the mirror member 16. The light reflected by the mirror layer 161 passes through the lens array 14 and is then reflected by the roof mirror array 10 back through the lens array 14, whereupon the light passes through the transparent plate of the mirror member 16 onto a recording medium 50 to form an image represented by the image signal emanating from the light-signal producing surface of the liquid crystal shutter array 20. The housing 18 is shaped such that the light-signal producing surface of the liquid crystal shutter array 20 is in registration with an object surface on which an unmagnified object image would be formed by an image-forming system composed of the roof mirror array 10 and the lens array 14. The liquid crystal shutter array 20 is fixed to the housing 18 such that the shutters are disposed in an appropriate position with respect to the other components.

Figure 2:
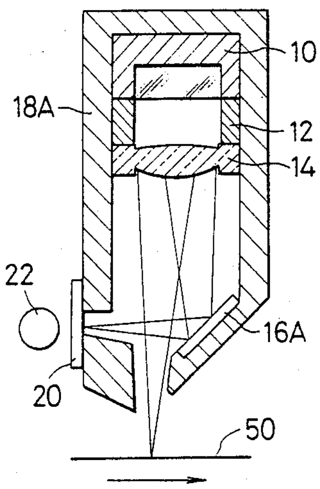
FIG. 2 is a transverse cross-sectional view of a device for writing optical information according to another embodiment of the present invention.

FIG. 2 shows another embodiment in which a housing 18A has an open slit for allowing an image ray of light to pass out of the housing 18A. A mirror member comprises a plane mirror 16A elongate in the Z direction and disposed in the housing 18A for reflecting light from the liquid crystal shutter array 20 toward the lens array 14.

Figure 3:
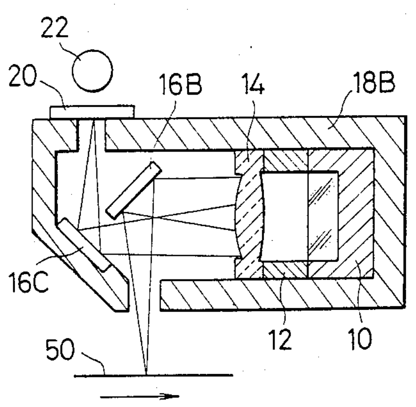
FIG. 3 is a transverse cross-sectional view of a device for writing optical information according to still another embodiment of the present invention.

According to still another embodiment illustrated in FIG. 3, a housing 18B has an open slit for allowing an image ray of light to pass out of the housing 18B. The housing 18B accommodates therein a mirror member comprising two plane mirrors 16B, 16C elongate in the Z direction for respectively reflecting light from the liquid crystal array 20 and light from the lens array 14.

Figure 4:
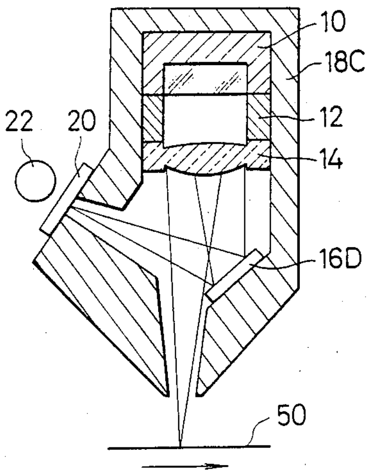
FIG. 4 is a transverse cross-sectional view of a device for writing optical information according to a still further embodiment of the present invention.
Figure 5:
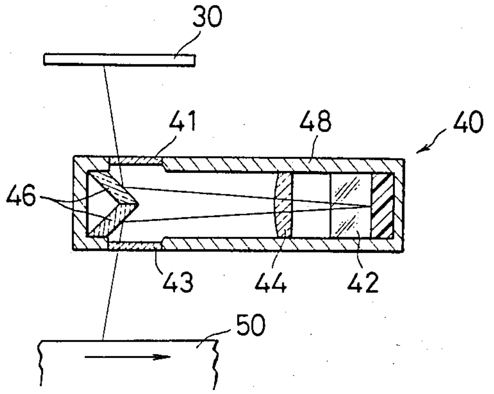
FIG. 5 PRIOR ART
FIG. 5 is a transverse cross-sectional view of a conventional device for writing optical information.

FIG. 4 shows a still further embodiment which is a modification of the embodiment of FIG. 2. In the embodiment of FIG. 4, light from the liquid crystal shutter array 20 is reflected at an acute angle by a mirror member comprising a plane mirror 16D which is elongate in the Z direction.

In the embodiments of FIGS. 2 and 4, the light from the liquid crystal shutter array 20 and the light leaving the lens array 14 to form an image intersect with each other. Therefore, the device is smaller in the transverse direction of the lens array 14, i.e., the horizontal direction in FIG. 2 for example. The devices shown in FIGS. 2 through 4 are functionally the same as the device illustrated in FIG. 1.

Figure 7:
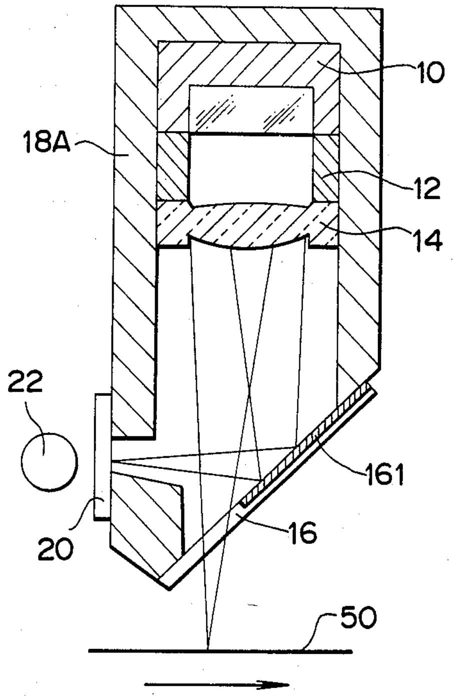
FIG. 7 is a transverse cross-sectional view of a device for writing optical information according to still another embodiment of the present invention.
Figure 8:
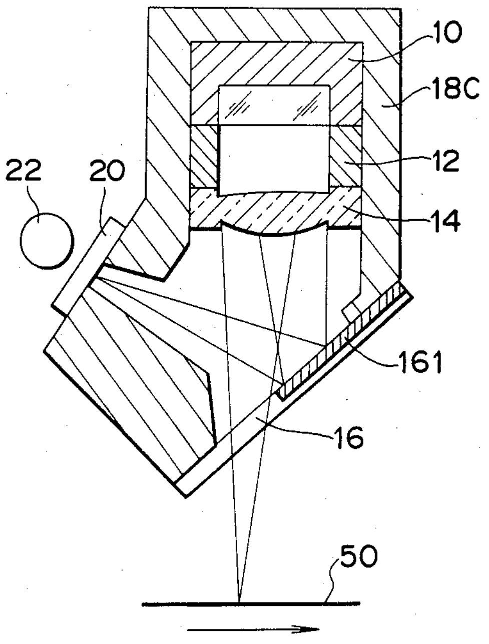
FIG. 8 is a transverse cross-sectional view of a device for writing optical information according to still another embodiment of the present invention.

According to the embodiment of FIG. 1, the vertical dimension of the device is about 32 mm, whereas the horizontal dimension thereof is about 20 mm. The devices of FIGS. 2 through 4 are of similar vertical and horizontal dimensions. In the embodiments of FIGS. 2, 3, and 4, a cover glass strip may be fitted in the light exit slit to guard against the entry of dust. Likewise, the embodiments of FIGS. 2 and 4 could include a mirror arrangement in the same manner shown in FIG. 1. Such an arrangement is shown in FIGS. 7 and 8 which includes a transparent plate and mirror surface 161 to make up the mirror member 16.

Figure 6:
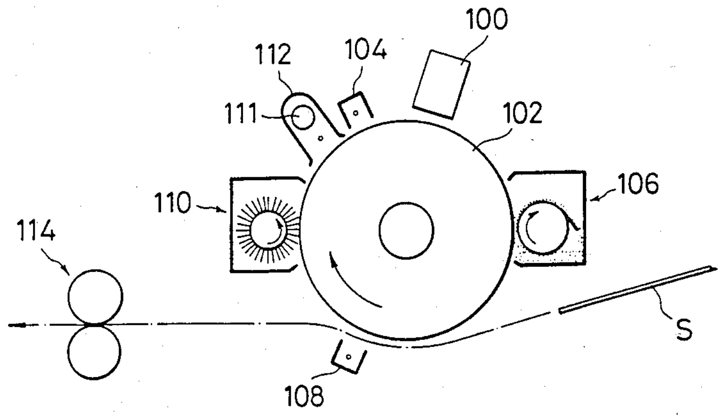
FIG. 6 is a schematic front elevational view of a recording apparatus which incorporates a device for writing optical information according to the present invention.

FIG. 6 schematically shows a recording apparatus comprising a device for writing optical information according to the present invention. The apparatus includes a device 100 for writing optical information, a photoconductive photosensitive body 102, a charger 104, an image development device 106, an image transfer device 108, a cleaning device 110, an charge eraser 112, and an image fixing device 114.

The photosensitive body 102 is in the form of a drum rotatable clockwise in the direction of the arrow. When recording an image, the cleaning device 110 and the charge eraser 112 are operated to clean the circumferential surface of the photosensitive drum 102 and remove charges therefrom. At the same time that the charge eraser 112 removes the charges from the photosensitive drum 102, the charge eraser 112 quenches the photosensitive drum 102 by applying light from a lamp 111 to the drum 102. Then, the photosensitive drum 102 is uniformly charged by the charger 104, and then optical information is written on the photosensitive drum 102 by the optical information writing device 100. An electrostatic latent image formed on the photosensitive drum 102 by the writing process is thereafter developed into a visible image by the image developing device 106. The visible image is electrostatically transferred from the photosensitive drum 102 onto an image transfer sheet S by the image transfer device 108, and then fixed to the sheet S by the image fixing device 114. The sheet S with the visible image fixed thereto is discharged from the apparatus, whereupon one cycle of recording process is completed.

Although certain preferred embodiments have been shown and described, it should be understood that many changes and modifications may be made therein without departing from the scope of the appended claims.

What is claimed is:

1. A device for writing optical information, comprising:

a housing having a roof mirror array, a lens array, an optical-path separator, a pair of slits extending in the same direction as a longitudinal direction of a lens array, and a mirror member being retained in said housing;

said roof mirror array composed of an array of roof mirrors arranged at a constant pitch;

said lens array extending in said longitudinal direction comprosed of an array of lenses at the same pitch as said constant pitch, each of said lenses being optically associated with one of said roof mirrors; and each optical axis of said lenses is perpendicular to a recording medium surface;

said optical-path separator disposed between said roof mirror array and said lens array for separating optical paths between said roof mirrors and said lenses associated therewith;

said mirror member comprising an elongated transparent plate with a mirror surface formed by vapor deposition on one longitudinal side of the plate which is disposed opposite to and remotely from said roof mirror array with said lens array interposed therebetween, said mirror member extending in the same direction as said longitudinal direction of said lens array, and disposed in covering relation to an exit from said housing;

a self-scanned recording element fixedly mounted on said housing and having a light-signal producing surface being held in registration with an object surface on which a unit magnification object image would be formed on said recording medium by said lens array and said roof mirror array.

2. A device according to claim 1, wherein said self-scanned recording element comprises one of an LED array, a fluorescent dot array, and a light valve.

3. A device according to claim 1, wherein said self-scanned recording element comprises a liquid crystal shutter array.

4. A device according to claim 1, wherein said mirror member is arranged to cause light from said self-scanned recording element and light from said mirror array to intersect with each other.

5. A device according to claim 4, wherein said mirror member is arranged to reflect, at an acute angle, light from said self-scanned recording element toward said lens array.

* * * * *